(12) United States Patent
Davis et al.

(10) Patent No.: US 10,598,404 B2
(45) Date of Patent: Mar. 24, 2020

(54) DAMPER WITH ADJUSTABLE RESISTANCE TO BLADE MOTION

(71) Applicant: Research Products Corporation, Madison, WI (US)

(72) Inventors: Peter J. Davis, Sun Prairie, WI (US); Thomas J. Anoszko, Verona, WI (US)

(73) Assignee: RESEARCH PRODUCTS CORPORATION, Madison, WI (US)

( * ) Notice: Subject to any disclaimer, the term of this patent is extended or adjusted under 35 U.S.C. 154(b) by 345 days.

(21) Appl. No.: 15/632,841

(22) Filed: Jun. 26, 2017

(65) Prior Publication Data
US 2018/0003408 A1 Jan. 4, 2018

Related U.S. Application Data

(60) Provisional application No. 62/356,117, filed on Jun. 29, 2016.

(51) Int. Cl.
| | |
|---|---|
| *F24F 13/14* | (2006.01) |
| *F24F 11/74* | (2018.01) |
| *F23L 13/02* | (2006.01) |
| *F16F 1/22* | (2006.01) |
| *F23N 3/02* | (2006.01) |

(52) U.S. Cl.
CPC ............ *F24F 13/1426* (2013.01); *F16F 1/22* (2013.01); *F23L 13/02* (2013.01); *F23N 3/02* (2013.01); *F24F 11/745* (2018.01); *F24F 2013/146* (2013.01)

(58) Field of Classification Search
CPC ............ F24F 13/1426; F24F 2013/146; F24F 11/745; F23L 13/02; F16F 1/22; F23N 3/02; Y10T 137/7898; Y10T 137/7902; Y10T 137/7875
See application file for complete search history.

(56) References Cited

U.S. PATENT DOCUMENTS

| | | | |
|---|---|---|---|
| 3,538,945 A | * 11/1970 | Dean, Jr. ............... | G05D 7/0173 137/499 |
| 3,977,650 A | 8/1976 | Berggren | |
| 4,088,150 A | 5/1978 | Serrati | |
| 4,099,551 A | * 7/1978 | Billington ................ | B67D 7/36 137/38 |

(Continued)

FOREIGN PATENT DOCUMENTS

| | | |
|---|---|---|
| GB | 1032699 A | 6/1966 |
| GB | 2468292 A | 9/2010 |

*Primary Examiner* — Jessica Cahill
*Assistant Examiner* — Patrick C Williams
(74) *Attorney, Agent, or Firm* — Craig Fieschko; DeWitt LLP

(57) ABSTRACT

A damper regulator for controlling the opening/closing characteristics of an HVAC damper has a swing arm coupled to the shaft on which the damper pivots. The swing arm has an arm carriage mounted to translate on the swing arm as the swing arm pivots, and a biasing spring connects the arm carriage to the damper regulator's housing, or to another suitable anchor. The translation of the arm carriage effectively adapts the characteristics of the biasing spring so that the damper need not be subjected to ever-increasing pressure to achieve greater airflow, or so that other damper opening characteristics can be achieved.

20 Claims, 4 Drawing Sheets

(56) References Cited

U.S. PATENT DOCUMENTS

| | | | |
|---|---|---|---|
| 4,196,745 A * | 4/1980 | Schutzer | F16K 1/223 |
| | | | 137/512.1 |
| 4,450,861 A | 5/1984 | Bouteille | |
| 4,523,609 A | 6/1985 | Weck | |
| 4,545,405 A | 10/1985 | LaBelle | |
| 4,628,954 A | 12/1986 | Dayus | |
| 4,819,716 A | 4/1989 | Beachboard | |
| 4,856,547 A * | 8/1989 | Solaroli | F16K 17/0446 |
| | | | 137/73 |
| 5,040,563 A | 8/1991 | Wood | |
| 5,249,596 A | 10/1993 | Hickenlooper, III et al. | |
| 5,411,056 A * | 5/1995 | Solaroli | F16K 15/033 |
| | | | 137/516.29 |
| 5,507,311 A | 4/1996 | Combe | |
| 5,713,390 A | 2/1998 | Huang | |
| 6,047,732 A | 4/2000 | Rueb | |
| 7,540,265 B2 | 6/2009 | Girard | |
| 8,375,984 B2 | 2/2013 | Wilcox | |
| 8,616,124 B2 | 12/2013 | Humbert | |
| 8,640,729 B2 | 2/2014 | Dana | |
| 9,032,993 B2 | 5/2015 | Barton et al. | |
| 9,664,409 B2 | 5/2017 | Marak et al. | |
| 2013/0333784 A1 | 12/2013 | Marak et al. | |
| 2013/0334325 A1 | 12/2013 | Marak et al. | |
| 2013/0337736 A1 | 12/2013 | Marak et al. | |

\* cited by examiner

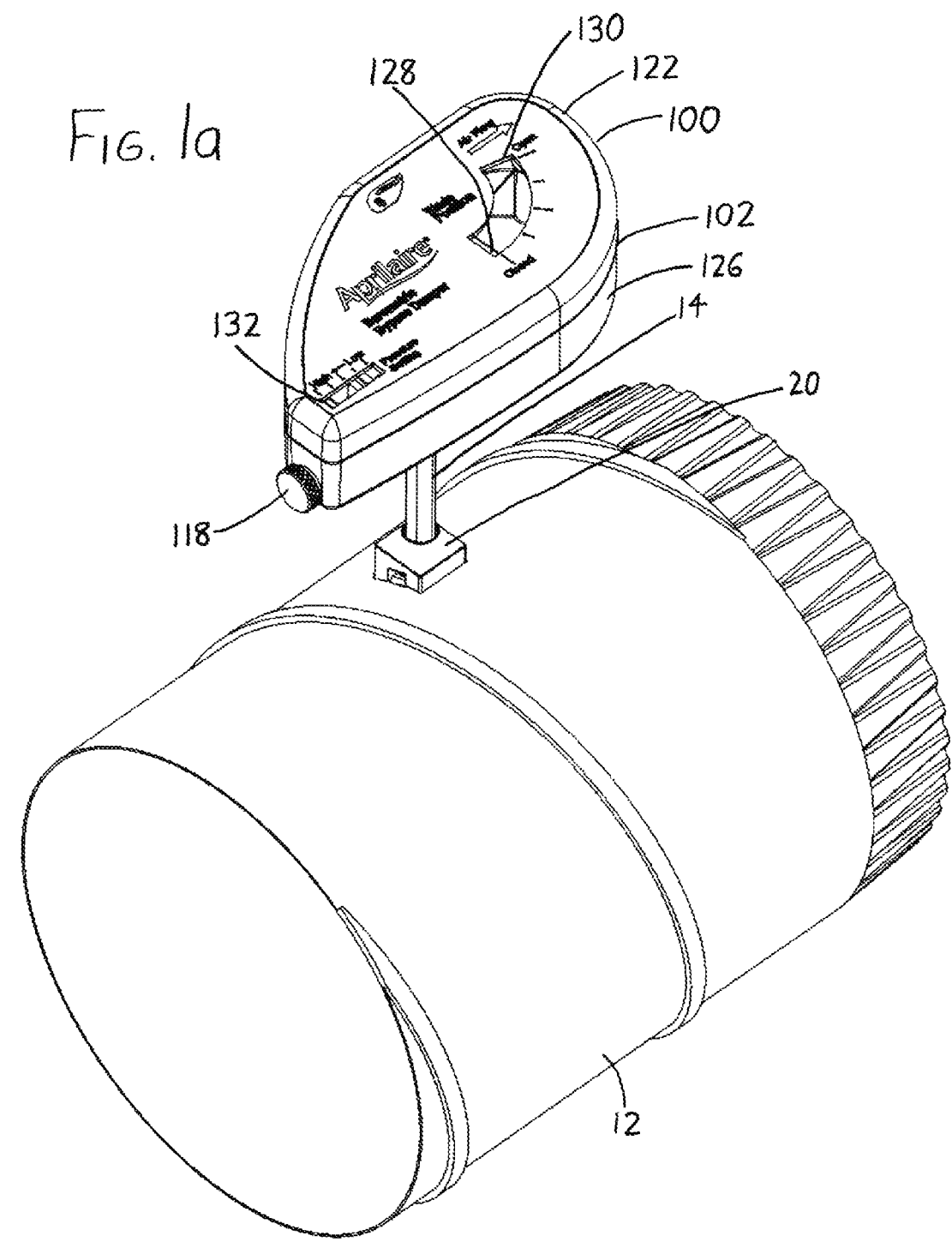

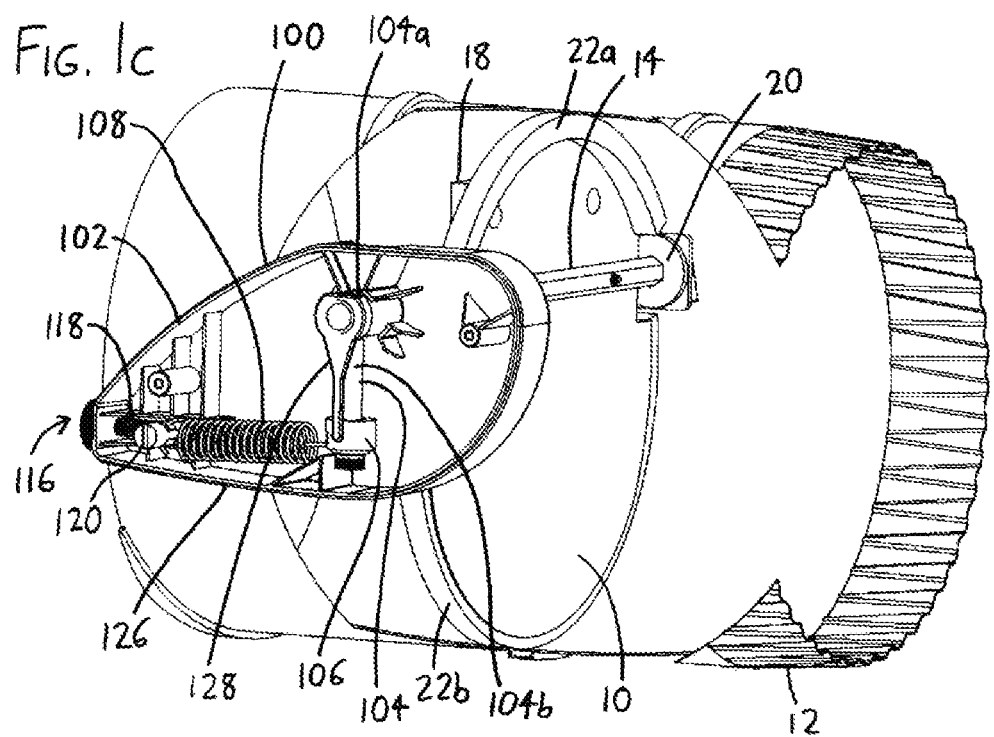
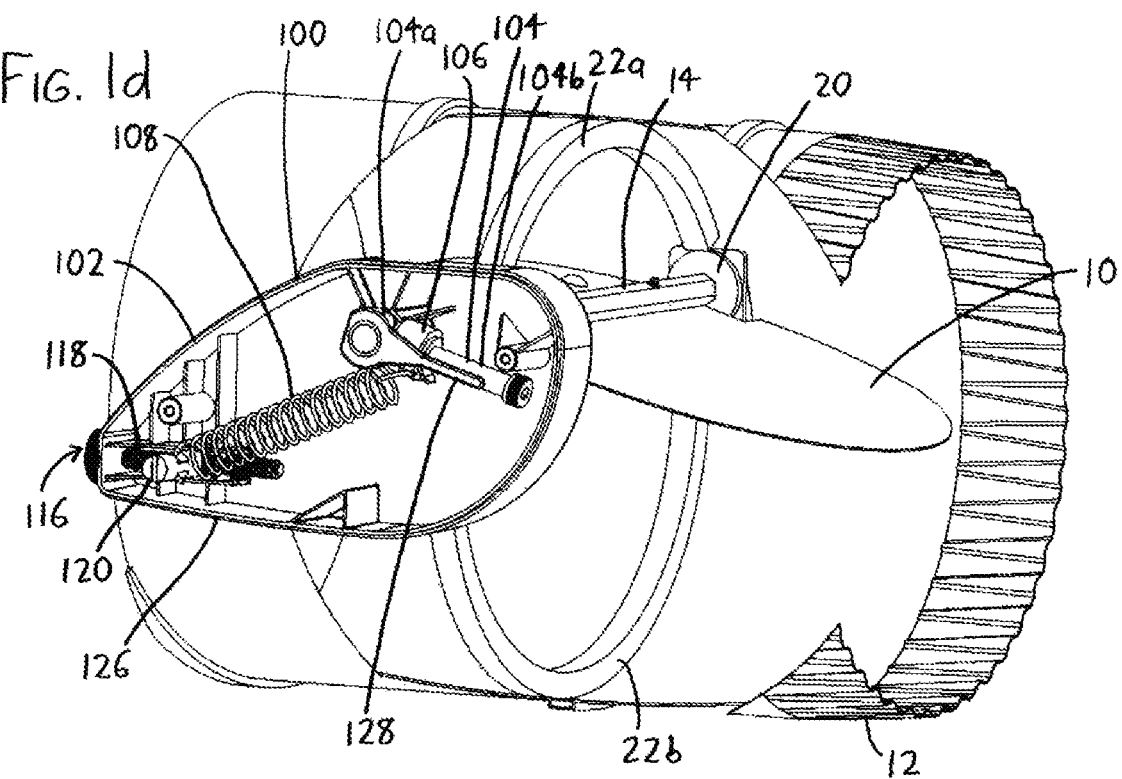

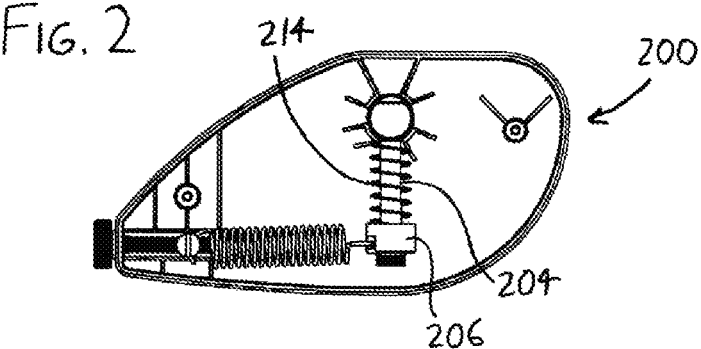
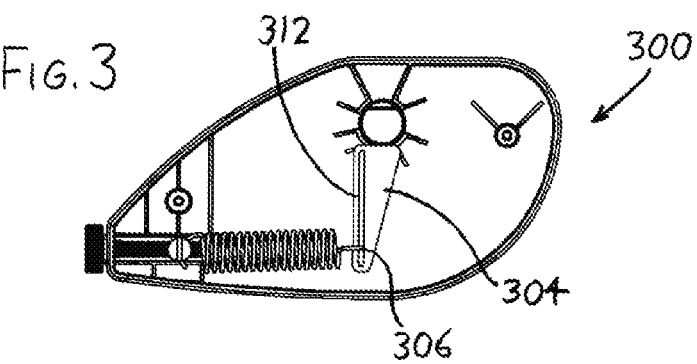
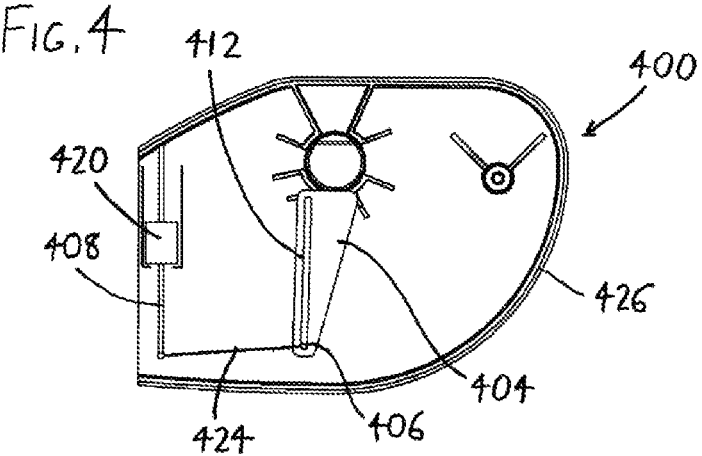

DAMPER WITH ADJUSTABLE RESISTANCE TO BLADE MOTION

CROSS-REFERENCE TO RELATED APPLICATIONS

This application claims priority under 35 USC § 119(e) to U.S. Provisional Patent Application 62/356,117 filed Jun. 29, 2016, the entirety of which is incorporated by reference herein.

FIELD OF THE INVENTION

This document concerns an invention relating generally to dampers for HVAC (Heating, Ventilating, and Air Conditioning) systems, and more specifically to dampers having adjustable opening force, allowing the dampers to open in response to a chosen pressure difference.

BACKGROUND OF THE INVENTION

Dampers are often situated in ducts of HVAC systems to regulate the flow of air. A damper is often provided as a flap/blade which pivots or otherwise moves on a shaft within an airflow passage to provide varying degrees of obstruction to airflow. The damper may automatically move in response to air pressure, typically with weights, springs, or other resistances being affixed to the damper blade (or damper shaft) to provide a desired degree of resistance to motion (usually a desired degree of resistance to the damper blade's opening). A regulator may be provided outside the duct surrounding the airflow passage to allow adjustment of the damper blade's position, and thus the degree to which the damper blade obstructs the airflow passage. Alternatively or additionally the regulator may allow adjustment of the damper blade's motion resistance. As examples, a manual regulator is often provided as handle which actuates the damper shaft to allow manual pivoting of the damper blade, or which adjusts spring tension to adjust the damper blade's motion resistance. Automatic regulators typically act in a similar manner, but use servomotors, solenoids, or other actuators to adjust damper blade position and/or damper blade motion resistance. The reader is directed to U.S. Pat. No. 5,249,596 to Hickenlooper, III et al., and to U.S. Pat. No. 9,032,993 to Barton et al., for further background concerning dampers.

HVAC systems can be optimized by use of dampers that provide the desired degree of airflow in response to upstream pressure (or more accurately, in response to the difference in upstream pressure versus downstream pressure). As an example, the Barton et al. patent describes a regulator that provides a damper with a relatively "flat" flow vs. pressure response, wherein the damper opens when a certain "crack" pressure is reached, and provides relatively constant resistance to airflow thereafter (i.e., a relatively constant pressure drop across the damper) regardless of the amount of airflow. This is in contrast with typical damper regulators, wherein greater airflow can only be achieved with greater pressure. This effect is illustrated by Hickenlooper, wherein the regulator spring-loads the damper: greater opening of the damper (and thus greater airflow) requires greater pressure. This can increase the load encountered by blowers and other HVAC air driving equipment, shortening the lifespan of such equipment, as well as increasing the noise generated by the HVAC system's ductwork. While the regulator of Barton et al. can help alleviate these problems, the Barton et al. regulator is significantly more complex and expensive than a regulator such as that of Hickenlooper, and thus there is a desire for alternative regulators which provide better flow vs. pressure response, and/or which more generally allow for greater customization of the flow vs. pressure response.

SUMMARY OF THE INVENTION

The invention involves a damper regulator which is intended to at least partially solve the aforementioned problems. To give the reader a basic understanding of some of the advantageous features of the damper regulator, following is a brief summary of preferred versions of the regulator, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

Looking to FIGS. 1a-1d, an exemplary regulator 100 for a damper 10 is shown adjacent a duct 12, with a rotatable shaft 14 extending from the regulator 100 into the duct 12. The damper 10 is rotatable on the shaft 14 within the duct 12 to provide varying degrees of airflow obstruction, with airflow being totally obstructed when the damper 10 is oriented generally perpendicular to the axis of the duct 12, as in FIG. 1c. Looking particularly to FIGS. 1b-1d, the regulator 100 includes:

a regulator housing 102;

a swing arm 104, shown disassembled as swing arm pivot 104a and swing arm rod 104b in FIG. 1b, wherein the swing arm 104 has a length extending from the pivot 104a, and rotates about the pivot 104a with respect to the regulator housing 102 (with the pivot 104a being attached to the shaft 14);

an arm carriage 106 affixed to move along the length of the swing arm 104, more specifically, to translate along the length of the swing arm 104 when the swing arm 104 rotates about the pivot 104a with respect to the regulator housing 102 (as seen by comparing FIGS. 1c and 1d); and a biasing spring 108 in connection with the arm carriage 106, wherein the biasing spring 108 exerts a biasing force on the arm carriage 106 when the swing arm 104 rotates about the pivot 104a.

Owing to the travel of the biasing spring 108 on the arm carriage 106, along the length of the swing arm 104 as the swing arm 104 rotates between the positions shown in FIG. 1c and FIG. 1d, the damper opening resistance offered by the biasing spring 108 does not increase as dramatically as where the biasing spring 108 is immovably fixed to a specific location along the swing arm 104, and thus the regulator 100 can provide the damper 10 with improved flow vs. pressure response. For example, after the "crack" pressure needed to open the damper 10 is achieved, flow can significantly increase with only low pressure increase.

The biasing spring 108 can be made to travel on the swing arm 104 by a variety of different arrangements, as by providing the arm carriage 106 in the form of a sleeve which extends about at least a major portion of the circumference of the swing arm 104 to slide thereon (as in FIGS. 1b-1d), or by providing a track extending along the length of the swing arm 104, wherein the arm carriage 106 is translatably engaged to the track (as in FIG. 3, wherein the arm carriage 306 is defined by a pin sliding within a slot-like track 312). Moreover, the damper's flow vs. pressure response can further be adapted by modifying the resistance of the biasing spring's travel along the swing arm 104. An example is illustrated in FIG. 2, wherein the swing arm 204 is provided with an arm spring 214 extending along its length, with the arm spring 214 exerting a biasing force on the arm carriage 206.

To allow further modification of the flow vs. pressure response provided by the regulator 100, the regulator 100 also preferably includes an adjustment assembly which is movably engaged to the regulator housing 102, wherein moving the adjustment assembly adjusts the biasing force exerted by the biasing spring 108 on the arm carriage 106 and swing arm 104. An exemplary adjustment assembly is shown in FIGS. 1c-1d at 116, and includes an adjustment screw which is rotatable with respect to the regulator housing 102, and an adjustment carriage 120 which is constrained to translate with respect to the regulator housing 102 (as by threadably engaging the adjustment carriage 120 to the adjustment screw, whereby rotating the adjustment screw with respect to the regulator housing 102 translates the adjustment carriage 120 with respect to the regulator housing 102). The biasing spring 108 extends between, and is engaged to, the arm carriage 106 and the adjustment assembly 116, such that rotation of the adjustment screw, and the resulting translation of the adjustment carriage 120, adjusts the biasing force exerted on the arm carriage 106 by the biasing spring 108. Such adjustment is particularly useful for adjusting the crack pressure at which the damper 10 first opens.

Further advantages, features, and objects of the invention will be apparent from the remainder of this document in conjunction with the associated drawings.

BRIEF DESCRIPTION OF THE DRAWINGS

FIG. 1a is a perspective view of a damper regulator 100 shown installed adjacent to a duct 12, wherein the regulator 100 adjusts the opening/closing response of a damper (not shown) within the duct 12 to air pressure upstream and downstream from the damper.

FIG. 1c shows the arrangement of FIG. 1a with the damper regulator 100 shown partially disassembled (more specifically, with the regulator housing cover 122 of FIG. 1b removed), and with a section of the duct 12 being removed so that the damper 10 (shown closed) is visible, and with the swing arm 104, arm carriage 106, and biasing spring 108 of the regulator 100 shown in their "damper closed" position.

FIG. 1d shows the arrangement of FIG. 1c with the damper 10 shown open, and with the swing arm 104, arm carriage 106, and biasing spring 108 of the regulator 100 shown in their "damper open" position.

FIG. 2 is an elevational (side) view of an alternative damper regulator 200 resembling that of FIGS. 1a-1d (with its regulator housing cover removed), but wherein the swing arm 104 is provided with an arm spring 214 fit about its length and bearing against the arm carriage 106.

FIG. 3 is an elevational (side) view of an alternative damper regulator 300 resembling that of FIGS. 1a-1d (with its regulator housing cover removed), but wherein the swing arm 304 has a slot-like track 312 defined therein, and the arm carriage 306 is defined by a pin which is translatable within the track 312.

FIG. 4 is an elevational (side) view of an alternative damper regulator 400 (shown with its regulator housing cover removed), wherein the swing arm 404 has a slot-like track 412 defined therein, and the biasing spring 408 is provided as a leaf spring, and is connected to the arm carriage 406 via an intermediate link 424.

DETAILED DESCRIPTION OF EXEMPLARY VERSIONS OF THE INVENTION

Figure 1B:
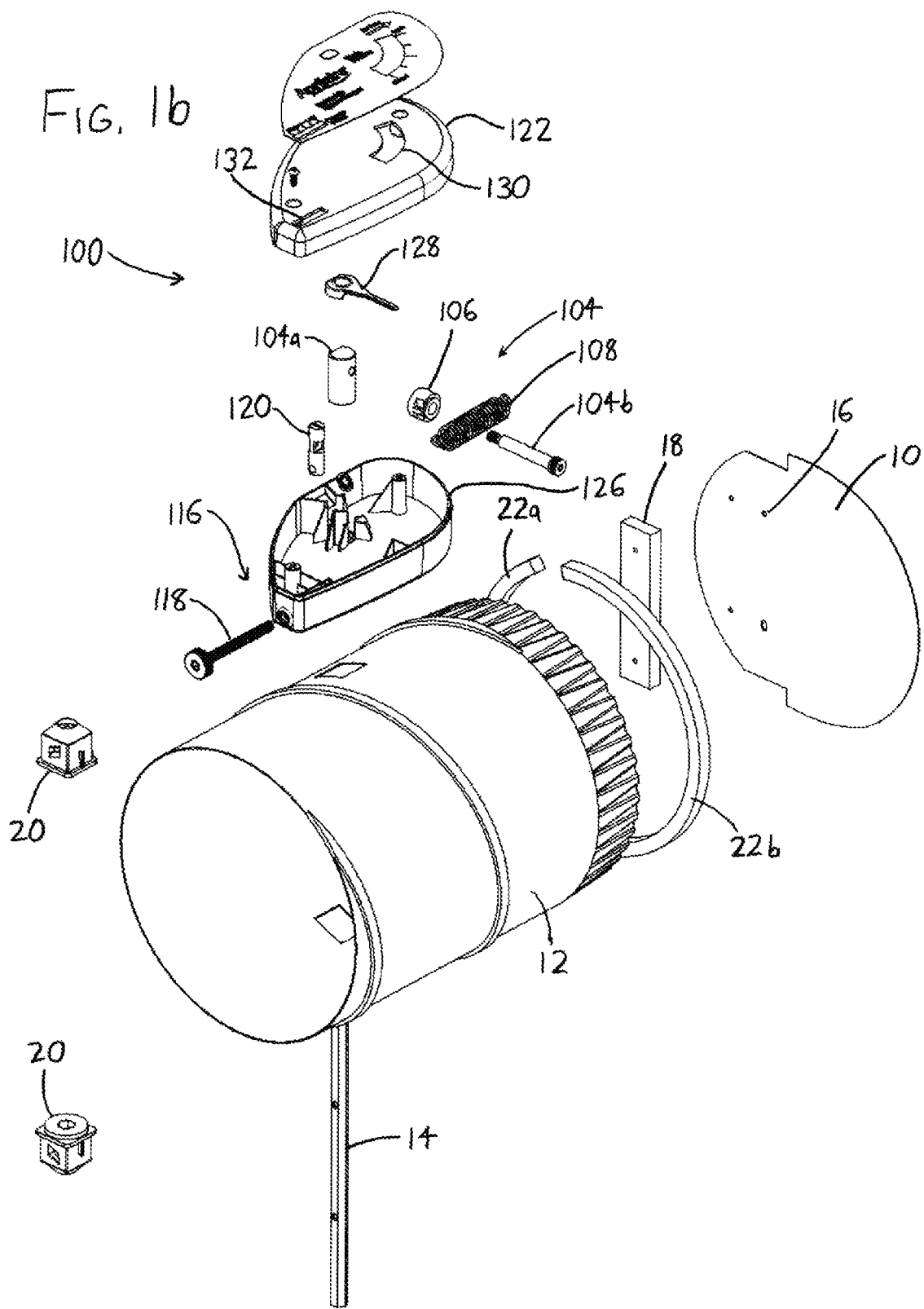
FIG. 1b shows the damper regulator 100 and duct 12 of FIG. 1a in exploded (disassembled) form, along with a damper 10 which rests within the duct 12 (and is controlled by the regulator 100) when assembled.

Expanding on the discussion above, the reader is referred to FIG. 1b for a more detailed explanation of the components of the exemplary damper regulator 100. Initially looking to the duct 12—which need not be provided with the regulator 100—this may take a variety of forms other than a cylindrical duct, e.g., a duct having an oval or rectangular/polygonal cross-section. In similar respects, the damper 10 need not be provided with the regulator 100, and may take any shape appropriate to allow it to fit across at least a substantial portion of the airflow passage of the duct 12 when in its "damper closed" position, and to rotate into a "damper open" position which offers less resistance to airflow. The damper 10 is shown as a flat blade with a substantially circular outer circumference slightly smaller than the inner circumference of the duct 12. The shaft 14 may be affixed to the damper 10 at a location slightly offset from its midline (at shaft attachments 16), thereby dividing the damper 10 into a major portion on one side of the shaft 14 and a minor portion on the opposite side of the shaft 14. A counterweight 18 may be affixed to the minor portion of the damper 10 so that the weights of the major and minor portions are more balanced about the shaft 14. Looking to FIGS. 1c-1d in addition to FIG. 1b, the shaft 14, with the damper 10 mounted thereon, is rotatably mounted within the duct 12 on bearings 18. A seal 22a is fit on the inner circumference of the duct 12 to abut the minor portion of one side of the damper 10, and a seal 22b is fit on the inner circumference of the duct 12 to abut the major portion of opposite side of the damper 10, such that the seals 22a and 22b seal about the perimeter of the damper 10 when in the damper closed position (FIG. 1c), and such that they only permit rotation of the damper 10 as shown in FIGS. 1c-1d.

The shaft 14 extends from the duct 12, and may be inserted through a regulator housing base 126, which may be affixed to the outer circumference of the duct 12 (such affixment not being shown in the drawings). Within the regulator housing base 126, the shaft 14 is received within the swing arm pivot 104a, and is affixed therein by threading an end of the swing arm rod 104b into the swing arm pivot 104a until it engages the shaft 14. Before doing so, the arm carriage 106 is fit over the swing arm rod 104b such that it may slide thereon between the swing arm pivot 104a and an enlarged outer end of the swing arm rod 104b. An indicator needle 128 is fit over the swing arm pivot 104a, preferably such that its length extends generally parallel to the plane of the damper 10, and preferably such that it is visible through a first cover window 130 in the regulator housing cover 122. A viewer can therefore determine the degree to which the damper 10 is open by viewing the needle 128 (see FIG. 1a).

Looking then to FIGS. 1c-1d, one end of the biasing spring 108 is then joined to the arm carriage 106, and the other is then preferably joined to a location on the regulator housing cover 122 and/or base 126 suitable to apply a biasing force to the swing arm 104 (more particularly, to its arm carriage 106), at least when the damper 10 rotates out of its damper closed state (thereby also rotating the shaft 14 and swing arm 104). The end of the biasing spring 108 opposite the arm carriage 106 is more preferably affixed to an aforementioned adjustment assembly 116, which is movable with respect to the regulator housing 102 such that the tension of the biasing spring 108 can be adjusted. This particularly has the effect of adjusting the crack pressure at which the damper 10 opens. The exemplary adjustment assembly 116 is shown disassembled in FIG. 1b as an adjustment screw 118 which is rotatable within the regulator housing base 126, and which has an end which protrudes from the housing base 126 to allow user adjustment. The adjustment screw 118 is threaded through an adjustment carriage 120, which is constrained within the housing base 126 such that it translates along the housing base 126 as the adjustment screw 118 is rotated. Thus, looking again to FIGS. 1c-1d, the biasing spring 108 may be adjustably tensioned by rotating the adjustment screw 118, thereby moving the adjustment carriage 120 (and the end of the biasing spring 108 affixed thereon) with respect to the swing arm 104 and arm carriage 106. A second cover window 132 is provided in the regulator housing cover 122 (again see FIG. 1a) such that a viewer can see an indicator line on the end of the adjustment carriage 120 to determine the degree to which the biasing spring 108 is pre-tensioned.

By use of the foregoing arrangement, the damper regulator 100 of FIGS. 1a-1d allows control of the crack pressure needed to open the damper 10 (primarily via the adjustment assembly 116), and also allows an airflow vs. pressure response which does not require ever-increasing pressure to achieve greater airflow (primarily owing to the biasing spring 108 tension relief afforded by the translation of the arm carriage 106 on the swing arm 104 as the swing arm 104 moves from its damper closed position of FIG. 1c to its damper open position of FIG. 1d). When the damper 10 is in its damper closed position (FIG. 1c), the arm carriage 106 is situated near the outer end of the swing arm 104, with the biasing spring 108 extending therefrom to the adjustment carriage 120. As upstream air pressure increases (and more particularly, as the pressure differential between the upstream and downstream sides of the damper 10 increases), the damper 10 begins to swing open on the shaft 14, with the indicator needle 128 and swing arm 104 rotating therewith. However, as shown in FIG. 1d, because the arm carriage 106 is slidably fit over the swing arm 104, it may translate along the length of the swing arm 104 as the swing arm 104 pivots so as to reduce tension in the biasing spring 108 (as seen by comparing the positions of the arm carriage 106 along the swing arm 104 in FIGS. 1c-1d). This sliding arrangement allows adaptation of the air pressure vs. volumetric airflow relationship provided by the regulator 100. If the biasing spring 108 was attached to a fixed location along the swing arm 104, owing to the spring's tendency to provide displacement (stretch) proportional to the force applied to the biasing spring 108, the damper 10 would tend to require ever greater upstream air pressure to achieve greater opening of the damper 10 (that is, greater volumetric airflow). However, the translating arm carriage 106 can effectively provide nonlinear spring response, such that the damper 10 might fully open upon reaching some threshold level of upstream pressure (or more typically, might begin opening upon application of some threshold crack pressure, and fully open upon experiencing only slightly greater pressure). Adjusting the adjustment screw 118, and thereby changing the distance between the adjustment carriage 120 and the arm carriage 106 (and thus changing the tension in the biasing spring 108), then allows adjustment of the damper's pressure-versus-airflow relationship, in particular, by adjusting the threshold pressure needed to initiate opening of the damper 10. Moreover, with modification of the swing arm 104 (e.g., by changing from a straight to curved configuration, and/or by making it flexible and/or extensible/retractable); or modification of the arm carriage 106 (e.g., by changing its resistance to sliding along the swing arm 104); and/or by using a spring with a more nonlinear response, the damper's pressure-versus-airflow relationship can further be configured to provide the desired response. FIG. 2 illustrates a damper regulator 200 of this nature, wherein the ability of the arm carriage 206 to slide along the swing arm 204 is modified by a spring fit about the swing arm 204, which resists the motion of the arm carriage 206.

The damper regulators 100 and 200 of FIGS. 1a-1d and FIG. 2 are only exemplary, and the foregoing regulator actions/functions can be provided by different mechanical arrangements. As an example, different arrangements can be used to provide translation of the arm carriage—more particularly, of the end of the biasing spring—on the swing arm. FIG. 3 illustrates a damper regulator 300 of this nature wherein the arm carriage 306 is provided in the form of a pin which slides within a track 312 defined along the length of the swing arm 304.

As another example, the biasing force provided by the biasing spring (and the adjustment spring) may be provided by structures other than helical springs, e.g., by elastomeric members, pneumatic cylinders, weighted levers, or other structures which provide a biasing force. FIG. 4 illustrates a damper regulator 400 wherein the biasing spring 408 is provided by a leaf spring having an end immovably anchored to the regulator housing 426. The adjustment carriage 420—here provided as a button restrained to slide (vertically) with respect to the regulator housing 426, and which receives the biasing spring 408 within an internal slot (not shown)—bears against the biasing spring as the adjustment carriage 120 translates, and allows adjustment of the effective length of the biasing spring 408 (its lower length below the adjustment carriage 420, which is the portion of the biasing spring 408 which is able to bend). This arrangement allows adjustment of the tension applied to the arm carriage 406 and swing arm 404 via the arm carriage 406, which (as in FIG. 3) is provided as a pin riding within a track 412 defined along the length of the swing arm 404. The biasing spring 408 is connected to the arm carriage 406 via an intermediate link 424, which is preferably rigid, though it may be able to flex/elongate instead (in which case it too may be regarded as a spring).

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:
1. A damper regulator including:
   a. a swing arm having a length extending from a pivot about which the swing arm rotates,
   b. an airflow passage shell adjacent the swing arm, the airflow passage shell surrounding an airflow path,
   c. a rotatable shaft extending from the pivot into the airflow passage shell,
   d. a damper affixed to the shaft within the airflow passage shell, the damper having opposing damper sides extending toward opposing sides of the airflow passage shell, wherein the opposing damper sides travel in opposite directions within the airflow path when the shaft rotates, e. an arm carriage which translates along the length of the swing arm when the swing arm rotates about the pivot, and f. a biasing spring in connection with the arm carriage, wherein the biasing spring exerts a biasing force on the arm carriage when the swing arm rotates about the pivot.

2. The damper regulator of claim 1 wherein the arm carriage extends about a major portion of the circumference of the swing arm.

3. The damper regulator of claim 1:
a. further including a track extending along the length of the swing arm,
b. wherein the arm carriage is translatably engaged to the track.

4. The damper regulator of claim 1 further including an arm spring extending along the length of the swing arm, the arm spring exerting a biasing force on the arm carriage.

5. The damper regulator of claim 1:
a. further including a regulator housing adjacent the swing arm, wherein the swing arm rotates relative to the regulator housing,
b. further including an adjustment assembly movably engaged to the regulator housing, wherein moving the adjustment assembly adjusts the biasing force exerted on the arm carriage by the biasing spring.

6. The damper regulator of claim 5 wherein the biasing spring:
a. is engaged to, and
b. extends between, the arm carriage and the adjustment assembly.

7. The damper regulator of claim 5 wherein the adjustment assembly includes an adjustment screw, the adjustment screw being rotatable with respect to the regulator housing to adjust the biasing force exerted on the arm carriage by the biasing spring.

8. The damper regulator of claim 5 wherein:
a. the adjustment assembly includes an adjustment carriage constrained to translate with respect to the regulator housing, and
b. translation of the adjustment carriage with respect to the regulator housing adjusts the biasing force exerted on the arm carriage by the biasing spring.

9. The damper regulator of claim 8 wherein the adjustment carriage is engaged to the biasing spring.

10. The damper regulator of claim 8 wherein:
a. the adjustment assembly further includes an adjustment screw, the adjustment screw being rotatable with respect to the regulator housing, and b. the adjustment carriage is engaged to the adjustment screw, whereby rotating the adjustment screw with respect to the regulator housing translates the adjustment carriage with respect to the regulator housing.

11. The damper regulator of claim 10 wherein the biasing spring extends between the arm carriage and the adjustment carriage.

12. The damper regulator of claim 8 wherein:
a. a portion of the biasing spring is immovably anchored to the regulator housing, and
b. the adjustment carriage moves across a length of the biasing spring as the adjustment carriage translates.

13. The damper regulator of claim 1:
a. wherein the damper further includes opposing damper faces, each damper face extending across both of the opposing damper sides,
b. further including a pair of seals within the airflow passage shell, each seal resting adjacent:
(1) one of the opposing damper sides, and
(2) one of the opposing damper faces, when the damper is in the closed position.

14. A damper regulator including:
a. a regulator housing,
b. a swing arm having a length rotatable with respect to the regulator housing,
c. an arm carriage affixed to move along the length of the swing arm,
d. a biasing spring exerting a biasing force on the arm carriage when the swing arm rotates with respect to the regulator housing, and
e. an adjustment assembly movably engaged to the regulator housing, wherein moving the adjustment assembly adjusts the biasing force exerted on the arm carriage by the biasing spring,
d. an airflow passage shell adjacent the regulator housing, the airflow passage shell defining a conduit surrounding an airflow path,
c. a rotatable shaft extending from the pivot into the airflow passage shell, wherein the length of the swing arm rotates with the shaft,
d. a damper within the airflow passage shell, the damper having opposing damper sides extending from the shaft toward opposing sides of the airflow passage shell, wherein the opposing damper sides travel in opposite directions within the airflow path when the shaft rotates.

15. The damper regulator of claim 14 wherein the adjustment assembly includes an adjustment screw, the adjustment screw being rotatable with respect to the regulator housing to adjust the biasing force exerted on the arm carriage by the biasing spring.

16. The damper regulator of claim 14 wherein the adjustment assembly includes an adjustment carriage, the adjustment carriage being translatable with respect to the regulator housing to adjust the biasing force exerted on the arm carriage by the biasing spring.

17. The damper regulator of claim 16 wherein the biasing spring:
a. is engaged to, and
b. extends between, the arm carriage and the adjustment assembly.

18. The damper regulator of claim 16 wherein:
a. the adjustment assembly further includes an adjustment screw, the adjustment screw being rotatable with respect to the regulator housing, and
b. the adjustment carriage is engaged to the adjustment screw, whereby rotating the adjustment screw with respect to the regulator housing translates the adjustment carriage with respect to the regulator housing.

19. A damper regulator including:
a. a regulator housing,
b. a rotatable shaft extending from the regulator housing,
c. a swing arm which rotates on the shaft relative to the regulator housing, the swing arm having a length extending away from the shaft,
d. a biasing spring in connection with the swing arm and the regulator housing, wherein the biasing spring travels along the length of the swing arm when the swing arm rotates relative to the regulator housing, e. an airflow passage shell adjacent the regulator housing, the airflow passage shell defining a conduit surrounding an airflow path,
f. a damper within the airflow passage shell, the damper:
  (1) having opposing damper sides extending toward opposing sides of the airflow passage shell, and
  (2) being configured to move, when the shaft rotates, between:
    i. a closed position wherein the opposing damper sides are closely adjacent the opposing sides of the airflow passage shell, whereby the damper at least substantially obstructs the airflow path, and
    ii. an open position wherein the opposing damper sides are further spaced from the opposing sides of the airflow passage shell than when in the closed position, whereby the damper provides lesser obstruction of the airflow path than when in the closed position, with the opposing damper sides travelling in opposite directions within the airflow path when the shaft rotates.

20. The damper regulator of claim 19 further including an adjustment carriage movably engaged to the regulator housing, wherein:
  a. the biasing spring extends between the swing arm and the adjustment carriage, and
  b. moving the adjustment carriage adjusts a biasing force exerted on the swing arm by the biasing spring.

* * * * *